3,404,115
METHOD OF TREATING MERCAPTAN MODI-
FIED POLYCHLOROPRENE RUBBERS WITH
ACRYLONITRILE
Shu Kambara, Ichiro Fukuoka, and Shoji Kimura, Tokyo,
Japan, assignors to Denki Kagaku Kogyo Kabushiki
Kaisha, Tokyo, Japan, a corporation of Japan
No Drawing. Filed Aug. 3, 1964, Ser. No. 387,226
Claims priority, application Japan, Aug. 20, 1963,
38/51,994
1 Claim. (Cl. 260—29.7)

ABSTRACT OF THE DISCLOSURE

A method of manufacturing polychloroprene rubbers by polymerizing chloroprene by using aliphatic mercaptans as polymerization modifiers and adding a small amount of acrylonitrile to the resulting polychloroprene latex after removing unreacted chloroprene monomer from the latex and subjecting the latex to a further treatment by conventional methods to obtain a rubber and then vulcanizing the resulting rubbers.

---

This invention relates to an improvement in a method of manufacturing polychloroprene rubbers, and especially to improved deodorizing effects on mercaptans remaining in polychloroprene rubbers and improved low temperature properties of polychloroprene rubbers.

Generally speaking, mercaptans have been used as a conventional polymerization-modifier in the process of polymerizing chloroprene. Mercaptans have excellent characteristics as a modifier, but they remain in products to give an offensive odor during succeeding processings of polychloroprene rubbers thus obtained such as milling and others, the odor of which not only exerts unpleasant influences on operators but also reduces the economic value of final products.

Especially when lower mercaptans having not more than 10 carbon atoms are used, their effects as a polymerization-modifier are excellent but they have disadvantage that offensive odor increases more.

As a conventional method of improving low temperature properties, especially the compression set of polychloroprene rubbers, trials have been made to copolymerize it with other monomers which are copolymerizable with chloroprene. It is, however, considerably difficult to select suitable monomers and the use of special monomers in quantity frequently results in an increased cost of products.

The invention provides improved deodorizing effects and improved low temperature properties of polychloroprene rubbers by adding a small quantity of comparatively inexpensive acrylonitrile to a latex of polychloroprene.

It is well known that the offensive odor of mercaptans is mainly due to —SH group thereof and mercaptans react with vinyl compounds such as acrylonitrile, and the inventors succeeded in removing the disgustful odor of polychloroprene rubbers by performing the above reaction in the latex of polychloroprene. In addition, rubbers thus obtained were found to be excellent in thermal stability, workability and other general physical properties, especially they are outstanding in low temperature properties.

The construction of the invention will now be explained. In the process of manufacturing polychloroprene rubbers by using mercaptans, to a latex of polychloroprene prepared by the conventional methods of polymerization and removal of monomer thereafter acrylonitrile is added at 10–50° C. while stirring sufficiently to cause effective reaction.

Insufficient addition of acrylonitrile cannot cause effective deodorization, and excessive addition of acrylonitrile affects the general physical properties in spite of excellent deodorizing effects, and hence suitable addition quantity is settled to be 0.1–2.0% (by weight), based on the quantity of polymer.

The invention will be further explained in detail by following examples.

EXAMPLE 1

Polymerization of chloroprene was carried out by using 0.16% (by weight) of n-heptyl mercaptan (n-C$_7$H$_{15}$SH) based on the quantity of chloroprene monomer as a polymerization-modifier, and the polymerization was short-stopped by adding 0.08% (by weight) of p-tert.-butyl catechol based on the quantity of unreacted monomer when the conversion reached at 62%, and monomer thereof was removed through a suitable process. To 1.5 liter of the latex of polychloroprene thus obtained 0.44 gram of acrylonitrile (0.1% by weight based on the quantity of polychloroprene) was added and the mixture was stirred for 5 hours at 30° C. in air to cause reaction. Then the latex was subjected to a conventional process of freeze-coagulation, washing with water and drying to obtain a sample of rubber. For the sake of comparison, 1.53 gram (mole equivalent to said quantity of acrylonitrile) of n-C$_7$H$_{15}$SCH$_2$CH$_2$CN (a substance synthesized by reaction of n-heptyl mercaptan with acrylonitrile) was added to 1.5 liter of said latex after removal of monomer, and the latex was stirred for about 30 minutes at 30° C. in the same manners as in the above example and was subjected to the same treatments as the above example to obtain another sample of rubber.

On 400 grams of each sample thus obtained tests were made for the sake of comparison with respects to the offensive odor during milling and other processings, thermal stability of raw rubbers, and general physical properties of vulcanizates. The results are shown in Table 1 together with corresponding data of a sample independent of the invention for reference. Here, the vulcanization was done under the following conditions.

Composition: Parts by weight
    Polychloroprene _____ 100
    Magnesia _____ 4.0
    Zinc oxide _____ 5.0
    Nocrac PA (phenyl-α-naphthylamine) _____ 1.0
    Nocceler-22 (2-mercaptoimidazoline) _____ 0.35
Conditions:
    Vulcanization temperature _____° C__ 141
    Vulcanization time _____minutes__ 20

TABLE 1

| Sample | Number 1 Made by adding 0.44 gram of acrylonitrile to 1.5 liter of latex | Number 2 Made by adding 1.53 gram of n-C$_7$H$_{15}$ SCH$_2$C H$_2$CN to 1.5 liter of latex | Number 3 Nothing added (reference) |
|---|---|---|---|
| (A) Milling characteristics | Good | Good | Good |
| (B) Offensive odor during milling and other processings | (¹) | (²) | (²) |
| (C) Thermal stability of raw rubbers (Mooney viscosity, after aging at 70° C.), days of aging before measurement is taken: | | | |
| 0 | 41.3 | 38.5 | 35.6 |
| 4 | 43.0 | 47.4 | 40.8 |
| 7 | 40.0 | 41.2 | 37.2 |
| 10 | 39.8 | 44.6 | 40.7 |
| (D) Physical properties of vulcanizates: | | | |
| (1) Tensile strength (kg./cm.²) | 203 | 218 | 205 |
| (2) Elongation (percent) | 810 | 800 | 830 |
| (3) 600% modulus (kg./cm.²) | 59.7 | 67.4 | 57.3 |
| (4) Hardness (Japanese industrial standard) | 41 | 46 | 45 |
| (5) Compression set (percent): | | | |
| −10° C | 18.3 | 37.9 | 37.6 |
| 20° C | 15.7 | 21.1 | 21.4 |
| 100° C | 62.5 | 70.1 | 67.3 |

¹ Almost no offensive odor given.
² Offensive odor given.

It is actually proved in Table 1 that the addition of acrylonitrile to the latex causes effective deodorization and improves low temperature properties by reducing the compression set at low temperatures without deteriorating other properties. Besides, it was found that the addition of a compound synthesized by using n-heptyl mercaptan and acrylonitrile did not give the effects of the invention.

EXAMPLE 2

Polymerization of chloroprene was carried out by using 0.21% (by weight) of n-dodecyl mercaptan (n-C$_{12}$H$_{25}$SH) based on the quantity of chloroprene monomer as a polymerization-modifier, and the polymerization was short-stopped by adding 0.08% (by weight) of p-tert.-butyl catechol based on the quantity of unreacted monomer when the conversion reached at 55%, and then monomer thereof was removed through a conventional process. To the latex of polychloroprene thus obtained 0.5–2.0% (by weight) of acrylonitrile based on the quantity of polymer were added and the mixture was stirred for 1 hour at 40° C. in air, and then the mixture was stirred for 5 hours at 40° C. in air to continue the reaction.

On the samples of rubber obtained by applying the same treatments as in Example 1 similar tests were made, and the results are shown in Table 2. The effects of the invention are apparent in this case too.

TABLE 2

| Number | 4 | 5 | 6 | 7 |
|---|---|---|---|---|
| Addition quantity of acrylonitrile (percent based on polymer) | ¹ 0 | 0.5 | 1.0 | 2.0 |
| (A) Milling characteristics | Good | Good | Good | Good |
| (B) Offensive odor during milling and other processings | (²) | (³) | (³) | (⁴) |
| (C) Thermal stability of raw rubbers (Mooney viscosity, with aging at 70° C.), days of aging before measurement is taken: | | | | |
| 0 | 54.0 | 56.0 | 53.7 | 57.5 |
| 4 | 50.0 | 53.2 | 49.5 | 56.1 |
| 7 | 54.1 | 51.4 | 53.0 | 57.9 |
| 10 | 57.1 | 54.5 | 52.8 | 59.0 |
| (D) Compression set of vulcanizates (percent): | | | | |
| −20° C | 57.7 | 25.7 | 29.5 | 35.6 |
| 20° C | 24.4 | 20.9 | 17.0 | 27.2 |
| 100° C | 59.8 | 64.4 | 55.9 | 68.4 |

¹ Reference.
² Offensive odor given.
³ Almost no offensive odor given.
⁴ No offensive odor given.

EXAMPLE 3

Example 1 was repeated except 0.5% (by weight) of acrylonitrile based on the quantity of polychloroprene was added.

The same treatments and tests as in Example 1 were made and rubber samples gave almost no offensive odor during milling and other processings. The values of compression set of the vulcanizates were 21.0%, 18.5% and 65.2% at −20° C., 20° C. and 100° C. respectively.

EXAMPLE 4

Polymerization of chloroprene was carried out by using 0.65% (by weight) of tert.-dodecylmercaptan (tert.-C$_{12}$H$_{25}$SH)

based on the quantity of chloroprene monomer as a polymerization-modifier, and the polymerization was short-stopped when the conversion reached at 59%, and then monomer thereof was removed through a conventional process.

To the latex of polychloroprene thus obtained 1.5% (by weight) of acrylonitrile based on the quantity of polychloroprene was added and the mixture was stirred for 8 hours at 40° C.

The same treatments and tests as in Example 1 were made and the rubber samples gave almost no offensive odor during milling and other processings and the values of the compression set of the vulcanizates thereof were 25.7%, 20.9% and 58.3% at −20° C., 20° C. and 100° C. respectively.

EXAMPLE 5

Example 1 was repeated except 0.13% (by weight) of n-butylmercaptan (n-C$_4$H$_9$SH) was used, the polymerization was short-stopped at 56% conversion and the addition quantity of acrylonitrile was 0.2% (by weight) on the quantity of polychloroprene.

The same treatments and tests as in Example 1 were made and the rubber samples gave almost no offensive odor during milling and other processings and the values of the compression set of vulcanizates thereof were 20.3%, 17.6% and 60.2% at −20° C., 20° C. and 100° C. respectively.

What we claim is:
1. In a method of preparing polychloroprene rubbers by preparing a polychloroprene latex by polymerizing chloroprene in the presence of a polymerization modifier comprising an aliphatic mercaptan containing less than about 10 carbon atoms and converting said latex to a rubber, the improvement comprising removing any unreacted chloroprene monomer from said latex and subsequently adding to said latex from 0.1 to 2.0% by weight of acrylonitrile based on the quantity of polychloroprene.

References Cited

UNITED STATES PATENTS 3,310,544  3/1967  Aho _____ 260—92.3

FOREIGN PATENTS 497,421  12/1938  Great Britain.
520,745  5/1940  Great Britain.
529,839  11/1940  Great Britain.
25,514  12/1936  Australia.

JOSEPH L. SCHOFER, *Primary Examiner.*

W. HAMROCK, *Assistant Examiner.*